BEST AVAILABLE COPY

UNITED STATES PATENT OFFICE.

LEBBEUS W. LATHROP AND THEODORE A. WEBER, OF NEW YORK, N. Y., ASSIGNORS, BY MESNE ASSIGNMENTS, TO THE LATHROP ANTI-FRICTIONATE COMPANY.

IMPROVEMENT IN ANTI-FRICTION COMPOUNDS FOR BEARINGS.

Specification forming part of Letters Patent No. 165,340, dated July 6, 1875; reissue No. 6,748, dated November 16, 1875; application filed October 16, 1875.

*To all whom it may concern:*

Be it known that we, LEBBEUS WISNER LATHROP and THEODORE ALEXANDER WEBER, both of the city, county, and State of New York, have invented a new and useful Improvement in Machinery Bearing, consisting in the compound of carbonated sugar and graphite, the same being compressed and united in a solid mass, of whatever form desired, while in a heated state, the sugar being used to effect the cohesion of the graphite by uniting and welding the particles together.

To prepare this anti-friction compound, take, for example, one pound of crystallized sugar. Heat it gradually up to about 400° while being rapidly stirred. This process causes the largest portion of the hydrogen and oxygen to escape, and increases, in same proportion, the carbon. Then add to this one quarter-pound of graphite, for the purpose of toughening. Then press, while heated to 250° or 300° Fahrenheit, into heated molds for making the shape desired.

Having thus described our invention, we claim as new and desire to secure by Letters Patent—

1. An anti-friction bearing for machinery formed of graphite whose particles have been united by cohesion and solidified by pressure, as set forth.

2. The process of forming solid anti-friction bearings by welding together the particles of graphite with melted sugar and subjecting the resultant to pressure, as described.

LEBBEUS WISNER LATHROP.
THEODORE ALEXANDER WEBER.

Witnesses:
JAMES H. HUNTER,
ALEX. F. ROBERTS.